United States Patent [19]

Thirion de Briel

[11] Patent Number: 4,573,948

[45] Date of Patent: Mar. 4, 1986

[54] SPEED VARIATOR PULLEY

[75] Inventor: Jacques Thirion de Briel, Levallois Perret, France

[73] Assignee: Valeo, Paris, France

[21] Appl. No.: 610,512

[22] Filed: May 15, 1984

[30] Foreign Application Priority Data

May 16, 1983 [FR] France .............................. 83 08047

[51] Int. Cl.⁴ .............................................. F16H 11/04
[52] U.S. Cl. ........................................ 474/28; 474/13
[58] Field of Search .................. 474/28, 11, 13, 16–18

[56] References Cited

U.S. PATENT DOCUMENTS

| 2,973,655 | 3/1961 | Hannover | 74/230 |
|---|---|---|---|
| 3,060,759 | 10/1962 | Brugghen | 474/16 |
| 3,381,968 | 5/1968 | Thirion de Briel | 277/95 |
| 3,906,808 | 9/1975 | Zaiser et al. | 474/16 |
| 4,132,120 | 1/1979 | Fénart | 474/16 |
| 4,143,558 | 3/1979 | Van Deursen et al. | 474/28 |
| 4,178,808 | 12/1979 | Bacher | 474/13 |
| 4,228,691 | 10/1980 | Smirl | 474/12 |
| 4,365,963 | 12/1982 | Thirion de Briel | 474/13 |
| 4,384,863 | 5/1983 | Huff et al. | 474/28 |
| 4,410,312 | 10/1983 | Thirion de Briel | 474/13 |
| 4,475,416 | 10/1984 | Underwood | 474/28 X |

FOREIGN PATENT DOCUMENTS

| 1167808 | 12/1958 | France . |
|---|---|---|
| 1245954 | 10/1960 | France . |
| 1593739 | 7/1970 | France . |
| 2214842 | 8/1972 | France . |
| 2211045 | 7/1974 | France . |
| 2347578 | 11/1977 | France . |
| 2382631 | 9/1978 | France . |
| 2489460 | 3/1982 | France . |
| 2516622 | 5/1983 | France . |
| 1226650 | 3/1971 | United Kingdom . |

Primary Examiner—Stephen J. Novosad
Assistant Examiner—Thuy M. Bui
Attorney, Agent, or Firm—Charles E. Brown; Charles A. Brown

[57] ABSTRACT

In this variator pulley, the movable flange plate (15A) is subjected to a diaphragm (26A) which is at least partially sealed and of which the supports on the movable flange plate (15A) and the corresponding support piece (30A) are themselves at least partially sealed.

According to the invention, the chamber (38A) jointly formed by the movable flange plate (15A), its hub (12A), the diaphragm (26A) and the support piece (30A) of the latter is at least partially sealed and thus itself constitutes a regulating chamber designed to be connected to any pressure source for regulating the assembly of the whole.

The invention is used, in particular, for speed variators intended for equipping motor vehicles.

11 Claims, 3 Drawing Figures

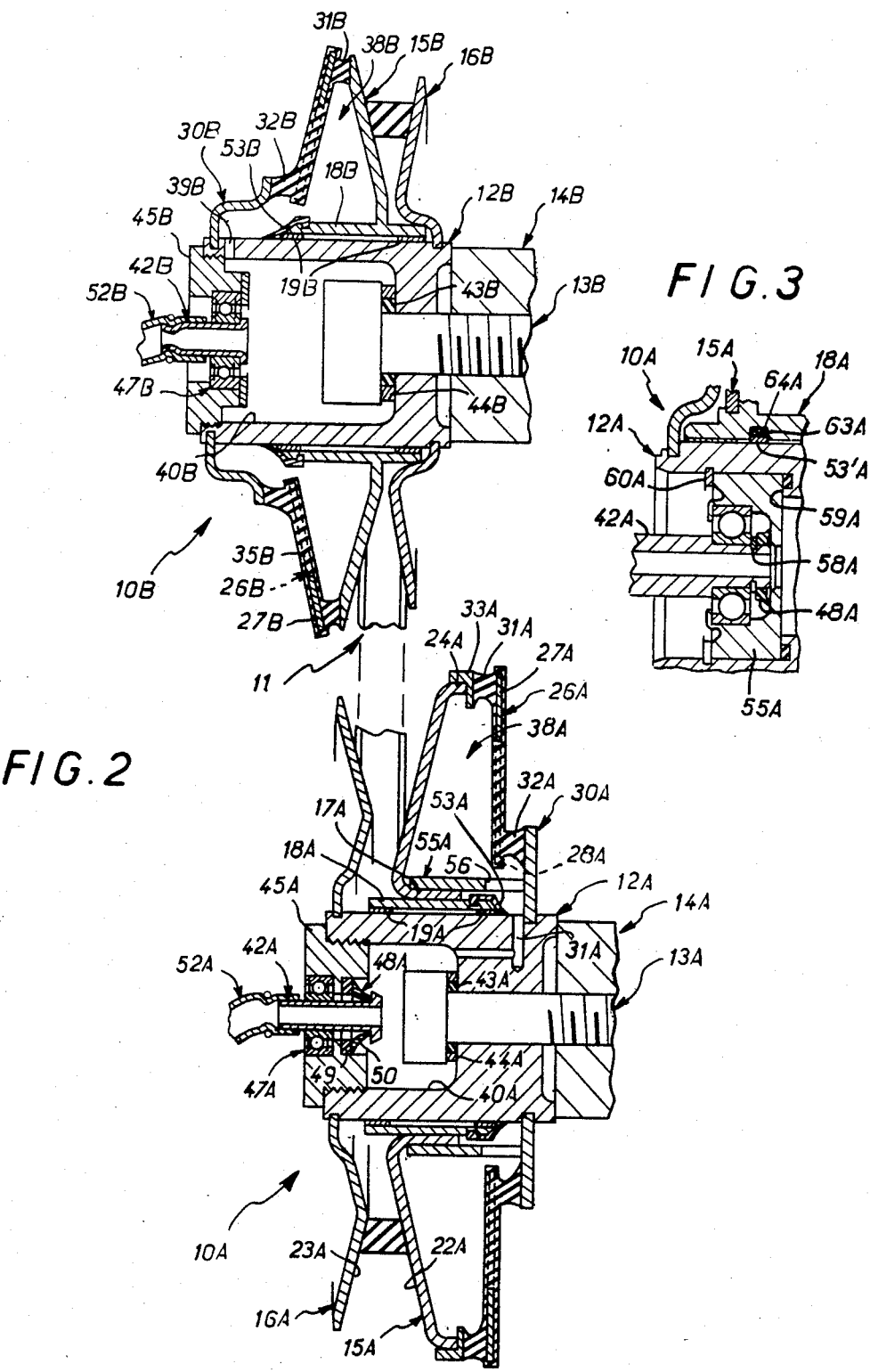

SPEED VARIATOR PULLEY

The present invention relates, in general terms, to speed variators of the type capable of being used, in particular, for the controlled driving of any component from any engine and, for example, on a motor vehicle, for driving, from the engine of the latter, any auxiliary component, such as an alternator, water pump, compressor or fan, conventionally equipping such a vehicle.

As is known, such a speed variator is formed substantially by two pulleys, one driving and the other driven, and a belt passed in an endless loop over both of these pulleys, each of the latter comprising a hub and, opposite one another, round the said hub, two annular flange plates, of which at least one, called a movable flange plate here for the sake of convenience, is mounted so as to be axially movable relative to the said hub, under the control of elastic restoring means.

Such a speed variator is described, in particular, in French Patent filed on 9th Apr., 1976 under No. 76/10,392 and published under No. 2,347,578.

In practice, the movable flange plates of the driving pulley and the driven pulley are each capable of being displaced in a paired manner between two end positions, one advanced and the other retracted in relation to the fixed flange plates with which they are associated, on the understanding that when the movable flange plate of the driving pulley is in the advanced position, the movable flange plate of the driven pulley is in the retracted position, and vice versa, and, for each of their positions, the belt in question occupies a specific configuration to which a specific transmission ratio corresponds.

For example, when stationary, the movable flange plate of the driving pulley can be in the advanced position under the stress of the elastic restoring means associated with it, and, the movable flange plate of the driven pulley then being in the retracted position, the transmission ratio is at maximum.

During operation, if, under the action of regulating means suitable for this purpose, the movable flange plate of the driving pulley is displaced from its advanced position into its retracted position, and the movable flange plate of the driven pulley is displaced in the opposite direction from its retracted position into its advanced position, the transmission ratio decreases accordingly.

The present invention is aimed, more particularly, at speed variators in which the axially acting elastic means associated with the movable flange plate of one and/or the other of the pulleys comprise an annular element, called a diaphragm, having, on the one hand, a peripheral part supported axially for tilting against the movable flange plate and, on the other hand, a central part, which in practice is fragmented into radial fingers, supported axially for tilting against a support piece, integral axially with the corresponding hub.

This is the case, in particular, in French Patent No. 76/10,392 mentioned above.

This is also the case in French Patent application filed on 18th Nov., 1981 under No. 81/21,590.

In the first case, the tilting supports of the diaphragm occur directly metal to metal.

In the second case, these tilting supports advantageously occur by means of axial spacers made of elastic material, which extend circularly and continuously, one on the outer periphery of the diaphragm on a first side of the latter, and the other on the inner periphery of this diaphragm on the other side of the latter, and which are preferably both integral axially and circumferentially both with the said diaphragm and with the movable flange plate, as regards the first, and with the support piece, as regards the second.

In practice, in both cases, the regulating means used for the desired variation in the transmission ratio consist of flyweights which, being sensitive to the centrifugal force, consequently act on the diaphragm of one and/or the other of the pulleys.

Such flyweights can, for example, be attached for this purpose to the diaphragm of the driving pulley; in this case, they are arranged so as to project from that face of the radial fingers of this diaphragm which is turned towards the corresponding movable flange plate.

Alternatively or in combination, similar flyweights can be attached to the diaphragm of the driven pulley; in this case, they are arranged so as to project from that face of this diaphragm which is opposite the corresponding movable flange plate.

At all events, such flyweights take effect automatically, in a passive way, as a result of simple inertia: they have no effect below a certain rotational speed, but exert their effects only above this speed.

In such a case, therefore, the criterion for regulating the transmission ratio, provided by such speed variators, is essentially linked to the rotational speed of their pulleys, for example that of their driving pulley when this is the only one to possess flyweights.

In parallel with this, there are known speed variators which are regulated by hydraulic control means designed to provide in a controlled manner an additional load suitable for the diaphragm in question.

Such an arrangement is described, in particular, in the French Patent filed on 28th Feb., 1978 under No. 78/05,765 and published under No. 2,382,631.

This French patent makes use for this purpose, at the end of the hub of the movable flange plate of the corresponding part, of a hydraulic regulating chamber which is formed between, on the one hand, a radial collar, forming a piston, of the said hub and, on the other hand, a flange plate integral with a sleeve, forming a cylinder, the opposite end of which forms the support piece associated with the diaphragm in question.

This results, in particular, in a considerable increase in the axial bulk of the assembly as a whole, and this can lead to difficulties in installing the latter when this installation must be carried out in a confined space, as occurs particularly in motor vehicles.

It also results in a substantial increase in the diametral bulk round the hub of the movable flange plate, and this can lead to difficulties of the same type.

Finally, with other conditions being the same, it results in a reduction in the radial dimension of the diaphragm, and this can make the working conditions of the latter more awkward and less easy to control.

The subject of the present invention is, in general terms, an arrangement which advantageously makes it possible to carry out the pneumatic or hydraulic regulation of a speed variator pulley, without resulting in the disadvantages briefly described above.

More specifically, its subject is a speed variator pulley of the type comprising a hub and, opposite one another, round the said hub, two annular flange plates, of which at least one, referred to as a movable flange plate for the sake of convenience, is mounted so as to be axially movable relative to the said hub under the control of axially acting elastic means comprising an annular component, referred to as a diaphragm, which, on the one hand, by means of a peripheral part, is supported axially by tilting against the said movable flange plate and which, on the other hand, by means of a central part, is supported axially by tilting against a piece, called a support piece, integral axially with the hub, in association with a regulating chamber capable of being connected to any pressure source for the controlled modification of the load of the diaphragm, this variator pulley being defined in that the chamber formed jointly by the movable flange plate, the diaphragm, the support piece and the hub is at least partially sealed and thus itself constitutes the assoicated regulating chamber.

Thus, without changing the radial bulk of the assembly as a whole, it is advantageously possible, in comparison with the arrangements described in French Pat. No. 2,382,631 mentioned above, to regulate the said assembly with a lower relative pressure, in any case, sufficiently low to make it possible to use the pressure or suction sources conventionally available in motor vehicles, such as the engine suction and/or a possible supercharging pressure.

Admittedly, there are known speed variator pulleys, of which the movable flange plate, the diaphragm, the support piece of the latter and the hub together form an at least partially sealed chamber.

This is the case, for example in French Pat. No. 1,593,739 of 28th Nov., 1968.

However, in this French Pat. No. 1,593,739 the sealing which is sought is essentially sealing relative to dust, to prevent any impurities from penetrating from outside into the chamber in question.

Consequently, the covering with which the diaphragm is equipped for this purpose extends only over the sole outer face of the latter, being extended onto the associated support piece and, if appropriate, onto the movable flange plate, beyond the supports of the said diaphragm on the said support piece and on the said moveable flange plate.

It goes without saying that, although such a covering is in fact capable of preventing any penetration of dirt from outside towards the interior of the chamber in question, on the contrary it offers only doubtful sealing from the interior of this chamber outwards, so that the latter could not form any sort of regulating chamber, for which purpose, moreover, it is not intended, since no pressure source is associated with it.

Of course, speed variator pulleys are also known in which the movable flange plate and the hub of the latter limit a sealed chamber.

This is the case, for example, in French Pat. No. 1,245,954 of 20th Jan., 1960.

However, in this French Pat. No. 1,245,954, the chamber in question is likewise not limited by the diaphragm, but by a cap which, extending transversely beyond the said diaphragm, is integral with the movable flange plate, thereby producing a non-deformable chamber incapable of forming any sort of regulating chamber, for which purpose, moreover, it is not intended, as before.

On the contrary, by means of the arrangement according to the invention, the regulation of the variator pulley in question, that is to say the passage of the movable flange plate of the pulley from one of its end positions to the other as a result of a modification of the load on its diaphragm, can be effected simply by exerting a specific pressure on the chamber delimited jointly by this movable flange plate, the diaphragm, the support piece of the latter and the hub of the assembly as a whole, whether this pressure is positive, where overpressure relative to the ambient atmosphere is concerned, or whether it is negative, where suction is concerned.

When a pneumatic pressure source is used for this purpose, it is not necessary for the sealing of this chamber to be complete, since in this case leaks are permissible.

On the contrary, when this pressure source is hydraulic, the sealing of the chamber delimited by the pulley in question is, however, preferably absolute or virtually absolute.

At all events, to achieve this sealing, according to a development of the invention it is possible advantageously to make use of the axial spacers made of elastic material which are liable to be employed to constitute the tilting axial supports of the diaphragm.

For this purpose, according to the invention, the diaphragm has, on both of its faces, a continuous covering in continuity with such axial spacers made of elastic material.

Thus, its sealing and that of its tilting axial supports on the movable flange plate and on the support piece are ensured in a suitable way, both in a direction from outside inwards and in the opposite direction, more specifically sought after, from the inside outwards.

Thus, since these supports of the diaphragm on the movable flange plate and the support piece are then tilting, elastically deformable both radially and axially and sealed, a force on the said movable flange plate can in fact be obtained by varying the pressure on the inside of the chamber limited by the assembly as a whole.

Jointly with this, sealing means are provided between the movable flange plate and the hub, and these sealing means can comprise, according to the invention, for example an annular lip gasket which is carried by the said movable flange plate on the inside of the chamber formed by this movable flange plate, this hub, the diaphragm and the support piece of the latter, and which bears on the said hub by means of its lip.

At all events, a speed variator, at least one of the pulleys of which conforms to the invention, can advantageously be regulated, for example, where a speed variator intended for driving a compressor on a motor vehicle is concerned, as a function of the pressure generated by this compressor or as a function of the engine suction at the level of the gas control.

In the event that the compressor is a supercharging compressor, the best possible regulation of the supercharging pressure can thus be achieved.

Moreover, the characteristics and advantages of the invention will emerge from the following description given by way of example, with reference to the attached diagrammatic drawings in which:

FIG. 2 is a view similar to that of FIG. 1, for the other end position of this movable flange plate;

Figure 1:
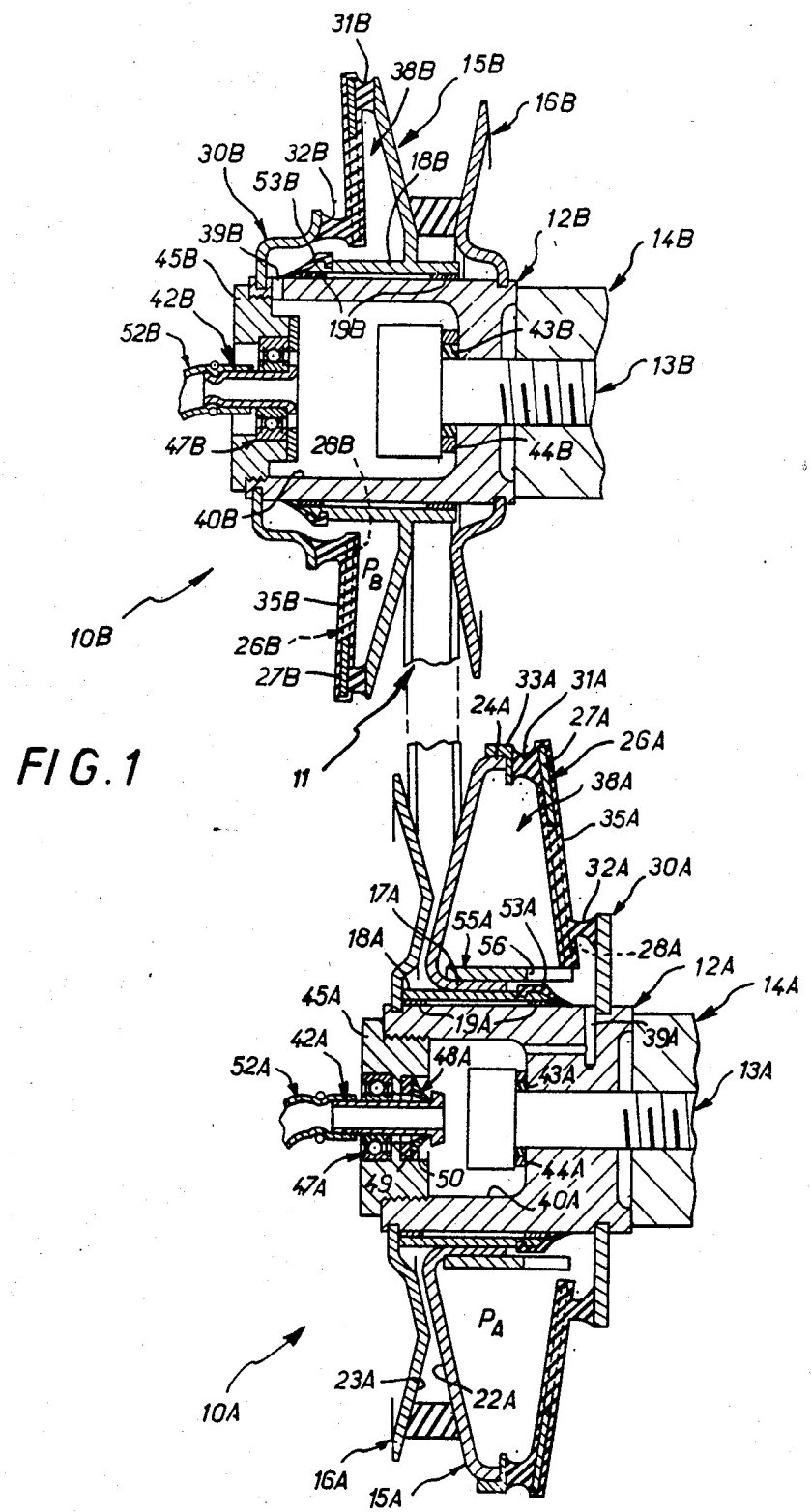
FIG. 1 is a view in axial section of a speed variator equipped with pulleys according to the invention, for one of the end positions of the movable flange plate of the pulleys.

Figure 3 a partial view similar to that of FIG. 1, for an alternative embodiment.

As illustrated in these Figures, the speed variator to which the invention applies comprises, in a conventional way, a driving pulley 10A, a driven pulley 10B and a belt 11 passed in an endless loop over these pulleys 10A, 10B.

In a likewise conventional way, the driving pulley 10A possesses a hub 12A which, for example, and as illustrated, is attached by means of a screw 13A at the end of a drive shaft 14A, thus being fixed in terms of rotation to the latter, and, opposite one another, round the said hub 12A, two annular flange plates 15A, 16A, at least one of which, the flange plate 15A in the embodiment illustrated, and referred to here as a movable flange plate for the sake of convenience, is mounted so as to be axially movable in relation to the hub 12A.

In the embodiment illustrated, the movable flange plate 15A has for this purpose, in its central zone, an axial collar 17A which, in practice, extends in the opposite direction to the other flange plate 16A and by means of which it is attached, for example by welding, to a sleeve 18A, and via the latter it is engaged to slide on the hub 12A, either with play or by means of bearings 19A located at the ends of such a sleeve 18A, as illustrated.

In the embodiment illustrated, the movable flange plate 15A is in one piece with its axial collar 17A, and on its periphery it has, in the same direction as the latter, an axial rim 24A.

In the embodiment illustrated, the associated flange plate 16A, referred to here as a fixed flange plate for the sake of convenience, is integral axially and in terms of rotation, that is to say circumferentially, with the hub 12A and, for example, as illustrated, it can be crimped for this purpose by its inner periphery, at the end of the said hub 12A.

Opposite one another, the flange plates 15A, 16A have frustoconical flanks 22A, 23A sloping in opposite directions to one another, and, jointly with these, the belt 11 has a trapezoidal cross-section, as illustrated.

In a way known per se, the movable flange plate 15A is under the control of axially acting elastic means which stress it permanently in the direction of the fixed flange plate 16A, and these axially acting elastic means comprise an annular element 26A, referred to as a diaphragm, which, on the one hand, by means of a peripheral part 27A is supported axially tor tilting against the said movable flange plate 15A and, more specifically, against the edge of the axial rim 24A of the latter and which, on the other hand, by means of a central part 28A is supported axially for tilting against a piece 30A, referred to here as a support piece simply for the sake of convenience, axially integral with the hub 12A.

In practice, and in a manner known per se, the peripheral part 27A of the diaphragm 26A is circularly continuous and forms a Belleville washer, whilst its central part 28A is fragmented into radial fingers.

In the embodiment illustrated, the tilting axial supports of this diaphragm 26A on the movable flange plate 15A and on the support piece 30A each make use of an axial spacer made of elastic material, 31A and 32A respectively, according to arrangements of the type described in French patent application No. 81/21,590 mentioned above.

In practice, these axial spacers 31A, 32A extend circularly in a continuous manner, the first on a first side of the diaphragm 26A, on the side of the latter facing the movable flange plate 15A, and the second on the other side of this diaphragm 26A and therefore on the side of the latter opposite the movable flange plate 15A.

In practice, also, these spacers made of elastic material 31A, 32A are integral axially and circumferentially both with the diaphragm 26A, on the one hand, and with the movable flange plate 15A and the support piece 30A, on the other hand.

In the embodiment illustrated, they both adhere directly to the diaphragm 26A.

The same is true of the support piece 30A for the axial spacer 32A.

In contrast to this, as regards the movable flange plate 15A, a connection piece 33A, for example of metal, is provided between it and the axial spacer 31A.

Such a connection piece 33A which has, in axial section, a right-angled profile in the embodiment illustrated can, for example, be fixed to the movable flange plate 15A by welding and, more specifically, to the axial rim 24A of the latter, whilst the axial spacer 31A adheres to this connection piece.

In the embodiment illustrated, the support piece 30A is confined to a simple plane washer which is, for example, attached by crimping to the relevant end of the hub 12A.

In a way known per se, the axial spacers 31A, 32A can very simply be "made to adhere" to the diaphragm 26A, on the one hand, and to the connection piece 33A and the support piece 30A, on the other hand, as a result of simple vulcanization in situ between the parts in question.

At all events, because such axial spacers 31A, 32A are used, the tilting supports of the diaphragm 26A on the movable flange plate 15A and on the support piece 30A are sealed, and they allow possible radial and/or axial displacement of the said diaphragm 26A between the said movable flange plate 15A and the said support piece 30A.

In practice, the diaphragm 26A is also sealed in the embodiment illustrated.

In fact, according to the invention, and for reasons which will appear below, in this embodiment the latter has, on both of its faces, a continuous covering 35A in continuity with the axial spacers 31A, 32A.

In practice, this continuous covering 35A, in which the diaphragm 26A is encased, intrudes into the slits separating two by two the radial fingers constituting the central part 28A of the latter.

In practice, also, this continuous covering 35A is produced in one piece with the axial spacers 31A, 32A at the very time when the latter are formed.

The driven pulley 10B has, overall, a similar construction to that of the driving pulley 10A.

Thus, it has a hub 12B wedged in terms of rotation on a shaft 14B by means of a screw 13B, a movable flange plate 15B subjected to a diaphragm 27B which bears on a support piece 30B integral with the hub 12B and which is encased in a continuous covering 35B in one piece with axial spacers made of elastic material 31B, 32B interposed between it and the movable flange plate 15B and the support piece 30B, and a fixed flange plate 16B.

Only minor differences are possible.

For example, as illustrated, instead of being a plane washer, the support piece 30B is a piece stamped in the form of a dish in the embodiment illustrated.

Moreover, the movable flange plate 15B is connected directly to the sleeve 18B associated with it, in the central zone of the latter.

According to the invention, for at least one of the driving and driven pulleys 10A, 10B, respectively, the chamber 38A, 38B formed jointly by the movable flange plate 15A, 15B, the diaphragm 26A, 26B, the support piece 30A, 30B of the latter and the hub 12A, 12B is at least partially sealed and thus itself constitutes a regulating chamber capable of being connected to any pressure source by means of a passage 39A, 39B.

For this purpose, and bearing in mind the at least partial seal possessed by the diaphragm 26A, 26B and the tilting supports of the latter on the movable flange plate 15A, 15B and the support piece 30A, 30B, sealing means are simply provided between the movable flange plate 15A, 15B and the hub 12A, 12B.

In the embodiment illustrated, these arrangements are adopted both for the driving pulley 10A and for the driven pulley 10B.

In practice, in this embodiment, to connect the corresponding regulating chamber 38A, 38B to a pressure source, use is made of the cavity 40A, 40B conventionally provided axially in the corresponding hub 12A, 12B to accommodate the screw 13A, 13B fixing such a hub to the shaft 14A, 14B in question.

For this purpose, this cavity 40A, 40B is itself made at least partially sealed, it has associated with it a branch nozzle 42A, 42B designed to connect it to the pressure source in question, the said branch nozzle 42A, 42B projecting in a sealed manner from the said cavity 40A, 40B and the passage 39A, 39B associated with the regulating chamber 38A, 38B makes the latter communicate with such a cavity 40A, 40B, being provided within the very body of the corresponding hub 12A, 12B.

In practice, in the embodiment illustrated, this passage 39A, 39B opens into the regulating chamber 38A, 38B at the axial end of such a regulating chamber 38A, 38B near to the corresponding support piece 30A, 30B.

On the same side as the screw 13A, 13B which is installed in the bottom of the cavity 40A, 40B, the at least partial sealing of this cavity 40A, 40B is ensured by means of a sealing gasket 43A, 43B arranged annularly round the shank of this screw 13A, 13B between the head of the latter and the said bottom of the cavity 40A, 40B.

To prevent excessive compression of this sealing gasket 43A, 43B, a tubular spacer 44A, 44B is provided round it between the head of the screw 13A, 13B and the bottom of the cavity 40A, 40B.

On the side of the cavity 40A, 40B opposite the screw 13A, 13B, the at least partial sealing of this cavity 40A, 40B is ensured by means of a plug 45A, 45B which is engaged by screwing into the orifice of the cavity 40A, 40B and through which the corresponding branch nozzle 42A, 42B passes axially in a sealed manner.

A ball bearing 47A, 47B is preferably interposed, as illustrated, between such a branch nozzle 42A, 42B arranged in this way in the axis of the corresponding hub 12A, 12B, on the one hand, on the plug 45A, 45B through which it passes, on the other hand.

Such a ball bearing 47A, 47B can itself be sealed to ensure the desired seal.

This is the solution adopted for the driven pulley 10B in the embodiment illustrated.

Alternatively, as regards the pulley 10A, there is, in this embodiment, a lip gasket 48A, forming a rotary gasket, between the plug 45A and the branch nozzle 42A.

For example, as illustrated, and in a way known per se, such a lip gasket can consist, on the one hand, of a washer 49 bearing on the plug 45A and, on the other hand, of a frustoconical portion 50 gripping the branch nozzle 42A by mean of its tapered part.

However, other types of gasket can be used, if desired.

Moreover, as with the driven pulley 35B, it may be sufficient to use a sealed ball bearing.

At all events, the branch nozzle 42A, 42B can be connected to any pressure source by means of any pipeline 52A, 52B.

As a corollary to this, the sealing means provided between the movable flange plate 15A, 15B of each pulley 10A, 10B and the corresponding hub 12A, 12B comprise, in the embodiment illustrated, an annular lip gasket 53A, 53B which is carried by the said movable flange plate 15A, 15B and, more specifically, by the sleeve 18A, 18B associated with the latter, on the inside of the corresponding regulating chamber 38A, 38B, and which bears on the said hub 12A, 12B by means of its lip.

In practice, and as illustrated, this lip gasket 53A, 53B extends in the direction of the corresponding support piece 30A, 30B and therefore in the direction of the passage 39A, 39B making the regulating chamber 38A, 38B to communicate with the cavity 40A, 40B of the hub 12A, 12B in question.

Preferably, and as illustrated, the movable flange plate 15A of the driving pulley 10A has associated with it a spacer 55A which is integral with the said movable flange plate 15A and which, by coming up against the associated support piece 30A, is designed to prevent this movable flange plate 15A and, more specifically, the lip gasket 53A integral with it, from covering the passage 39A causing the regulating chamber 38A to communicate with the cavity 40A of the hub 12A.

In the embodiment illustrated, this spacer 55A, which is integral with the axial collar 17A of the movable flange plate 15A, for example as a result of welding, is a perforated tubular spacer, its end directed towards the support piece 30A having notches 56 at intervals.

At rest, FIG. 1, the situation is, for example, such that, as illustrated, because of the characteristics of the diaphragms 26A, 26B, on the one hand, and the pressure $P_A$, $P_B$ prevailing in the regulating chambers 38A, 38B, on the other hand, the movable flange plate 15A of the driving pulley 10A is in the advanced end position near to the corresponding fixed flange plate 16A, whilst on the contrary the movable flange plate 15B of the driven pulley 10B is in the retracted end position distant from the corresponding flange plate 16B.

In such positions which are determined, for example, when the sleeve 18A of the movable flange plate 15A of the driving pulley 10A comes up against the corresponding fixed flange plate 16A, as illustrated, the transmission ratio from the driving pulley to the driven pulley 10B is at a maximum.

To change this transmission ratio towards a lower value, it is sufficient either to reduce the pressure $P_A$ in the regulating chamber 38A of the driving pulley 10A, or to increase the pressure $P_B$ in the regulating chamber 38B of the driven pulley 10B or to act simultaneously on both of these pressurse.

In fact, since the corresponding movable flange plates 15A, 15B are then subjected to an axial thrust stressing them in the direction of their opposite end position, everything happens as though the load on the diaphragms 26A, 26B to which they are subjected were modified, in a controlled manner, in proportion to the pressure in the corresponding regulating chamber 38A, 38B.

It is thus possible, according to the invention, to regulate the variator, that is to say control its transmission ratio, by any pressure means.

If the pressure source or sources used for this purpose are pneumatic, it is possible to allow slight leaks as regards the regulating chambers 38A, 38B, if desired, and because of this it is indicated specifically here that the sealing of these chambers need only be partial.

If, on the other hand, the corresponding pressure source or sources are hydraulic, it is preferable that the leak-proofing of the regulating chambers 38A, 8B should be absolute or virtually absolute.

Of course, in the event that the pressure source or sources used are pneumatic, these can be either positive pressure sources or negative pressure sources, in which latter case the variator is regulated by means of a partial vacuum.

As will be noted, in the embodiment illustrated, the diaphragms 26A, 26B alone form the axially acting elastic means to which the corresponding movable flange plates 15A, 15B are subjected, without having associated with them, as is customary, any helical springs for restoring these movable flange plates 15A, 15B to the initial position of rest; however, such a spring or such springs can of course be provided, if necessary.

Furthermore, the sealing lip gasket used between each movable flange plate and the corresponding hub advantageously acts as a scraper gasket, and under the effect of pressure it is advantageously laid against the said hub by means of its lip, this being favorable to the desired sealing.

Finally, since no flyweight is used, the driving pulley and driven pulley can advantageously have identical constructions, if desired, this being favorable to a reduction in their production and assembly cost.

However, it goes without saying that flyweights can, if necessary, be used in the conventional way.

The alternative embodiment illustrated in FIG. 3 is designed more particularly for suction regulation.

Taking, for example, the driving pulley 10A, as illustrated, the lip gasket 48A then preferably bears on the nozzle 42A by means of an elastic ring 58A engaged with a groove in this nozzle 42A, and by means of its lip it bears on the plug 55A which, in the embodiment illustrated, is engaged in the hub 12A, being retained against an inner shoulder 59A of this hub 12A by an elastic ring 60A engaged with a groove in the latter.

Jointly with this, there takes effect between the sleeve 18A of the movable flange plate 15A and the hub 12A not a lip gasket, as before, but a cylindrical gasket 53'A which, made, for example, of carbon or polytetrafluoroethylene, is itself encircled by an 0-ring 63A which stresses it permanently in the direction of the hub 12A.

The assembly, accommodated in a groove 64A in the sleeve 18A, is advantageously suitable both for regulation by means of pressure and for regulation by means of suction.

Moreover, the present invention is not limited to the embodiments described and illustrated, but embraces any alternative form of execution and/or any alternative combination of their various elements.

In particular, when a simple axial support is sufficient for the necessary sealing, the spacers made of elastic material which are used need only be fixed circumferentially, for the transmission of the torque to the diaphragm, the movable flange plate and the support piece between which they take effect.

I claim:

1. A variable speed pulley device comprising a hub, two annular flange plates disposed around said hub and facing each other, one of said flange plates being a movable flange plate and mounted for axial movement relative to said hub against the bias of a diaphragm spring, said diaphragm spring bearing axially against a peripheral part of said movable flange plate for rocking movement, and a central part of said diaphragm bearing axially against a support member fixed axially relative to said hub, and a pressure regulating chamber adapted to be connected by a fluid passage to a source of pressurized fluid; said pressure regulating chamber comprising an at least partially fluid-tight enclosure defined by said movable flange plate, said diaphragm spring, said support member and said hub.

2. A variable speed pulley according to claim 1, wherein said diaphragm spring is encapsulated in elastic material which is continguous with said movable flange plate peripheral part and said support member so that the diaphragm spring itself and its rocking connections with said movable flange plate peripheral part and said support member are fluid-tight, and sealing means between said movable flange plate and said hub on which said movable flange plate is slidably mounted.

3. A variable speed pulley according to claim 2, wherein axial spacers of said elastic material rockably mount said diaphragm spring on said movable pulley flange peripheral part and on said support member, said axial spacers being integrally formed with said elastic material encapsulating said diaphragm spring.

4. A variable speed pulley accoording to claim 2, wherein said sealing means between said movable flange plate and said hub comprises a gasket.

5. A variable speed pulley according to claim 4, wherein said gasket is an annular gasket carrier by said movable flange plate and disposed inside the chamber, said lip being in sealing contact with said hub.

6. A variable speed pulley according to claim 2, wherein said sealing means between said movable flange plate and said hub comprises a cylindrical gasket encircled by an O-ring.

7. A variable speed pulley according to claim 2, wherein said fluid passage is located at an axial end of said regulating chamber adjacent said support member, a spacer fixed to said movable flange plate and adapted to abut against support member, said spacer having means permitting communication between said regulating chamber and said fluid passage in all positions of said movable flange plate, and therefore all positions of said spacer relative to said hub.

8. A variable speed pulley according to claim 7, wherein said spacer is a perforated tubular member.

9. A variable speed pulley according to claim 1, further comprising a cavity in said hub and a branch nozzle sealingly received in said cavity for providing communication between said cavity and the source of pressurized fluid.

10. A variable speed pulley according to claim 9, wherein said branch nozzle is arranged along the axis of said hub.

11. A variable speed pulley according to claim 1, and including sealing means for substantially sealing said enclosure defined by said movable flange plate, said diaphragm spring, said support member and said hub to define a substantially fluid-tight enclosure.

* * * * *